R. N. CHAMBERLAIN.
PLATE FOR STORAGE BATTERIES AND METHOD OF MAKING SAME.
APPLICATION FILED AUG. 11, 1919.

1,376,920.

Patented May 3, 1921.

Inventor,
Rufus N. Chamberlain
by Guyer & Pope
Attorneys.

UNITED STATES PATENT OFFICE.

RUFUS N. CHAMBERLAIN, OF CHICAGO, ILLINOIS, ASSIGNOR TO GOULD STORAGE BATTERY COMPANY, OF DEPEW, NEW YORK, A CORPORATION OF NEW YORK.

PLATE FOR STORAGE BATTERIES AND METHOD OF MAKING SAME.

1,376,920.  Specification of Letters Patent.  Patented May 3, 1921.

Application filed August 11, 1919. Serial No. 316,525.

*To all whom it may concern:*

Be it known that I, RUFUS N. CHAMBERLAIN, a citizen of the United States, residing at Chicago, in the county of Cook and State of Illinois, have invented new and useful Improvements in Plates for Storage Batteries and Methods of Making Same, of which the following is a specification.

This invention relates to a storage battery containing negative plates of the Planté type and separators of wood or fibrous material between the negative and positive plates.

The object of this invention is to produce a substantially smooth surfaced Planté negative, in order to enable the flat side of a wood or fibrous separator to rest against the negative without being cut or torn by its uneven surface.

In the prior form of Planté's negatives, made by one of the usual mechanical processes of producing a ribbed and grooved surface such as spinning, swaging, rolling or plowing the surface of a smooth blank of lead, the edges of the ribs so formed are often sharp and uneven, thus tending to cut, crack or otherwise injure the flat surface of a wood or fibrous separator, when pressed against it by an adjacent positive plate.

Therefore, to avoid this mechanical breaking down of the wood or fibrous separator, I have invented the method of placing hard, smooth surfaced blocks against the surface of the negative plates and by hydraulic pressure, or other suitable means, substantially pressing down the high surfaces, or rough edged ribs, so as to secure a comparatively smooth surfaced negative.

However, since the best time to press the surface of the Planté negative is after formation, or when in a developed condition, there is great likelihood of the spongy active material becoming so compressed as to loose much of its porosity and thus useful capacity. Therefore, to recover its necessary porosity, I reverse the negative plate, after pressing its surface smooth enough for wood separators, to a positive condition. This reversing of the negative to a positive condition reëstablishes the porous condition of the active material by oxidizing the compressed spongy lead to peroxid of lead. Then by reversing the Planté back to its proper negative condition, I reëstablish the necessary capacity and the negative plate, therefore, then has not only the required smooth surface, but also the desired capacity.

Figure 1:
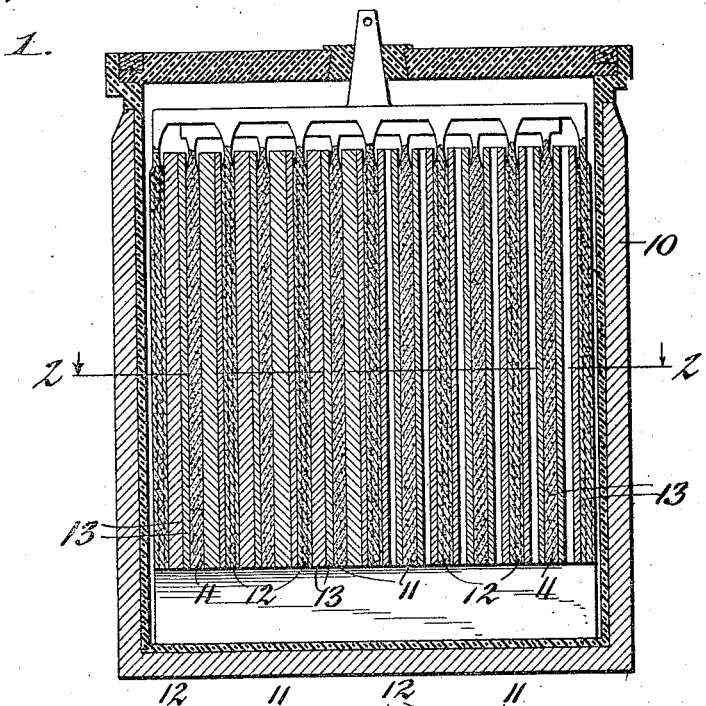
Figure 2:
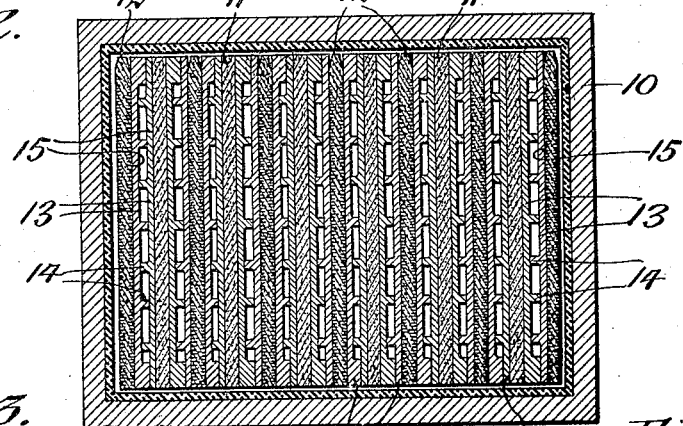
Figure 3:
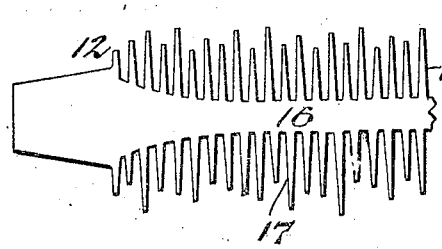
Figure 4:
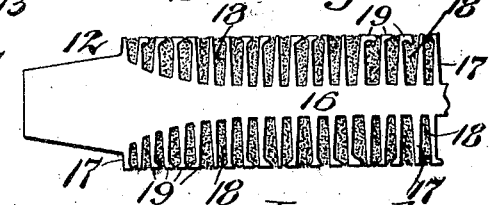

In the accompanying drawings:

Figure 1 is a vertical section of a storage battery equipped with my improved form of negative plate. Fig. 2 is a horizontal section of the same taken on line 2—2, Fig. 1. Fig. 3 is a fragmentary end view, on an enlarged scale, showing the body of the negative plate and the form of the ribs thereon preparatory to filling the spaces between the ribs with active material and pressing or upsetting the outer edges of the ribs into even form. Fig. 4 is a similar view, showing the spaces between the ribs filled with active material and the outer edges of the ribs pressed inwardly or upset so that they are even.

Similar characters of reference indicate corresponding parts throughout the several views.

10 represents the jaw of the storage battery which may be of any suitable construction, 11, 12 the upright transverse positive and negative plates arranged alternately in a longitudinal row with a charge of electrolyte contained within the jar, and 13 a plurality of separators of wood or other fibrous material arranged between the opposing surfaces of adjacent positive and negative plates.

The separators in this instance are arranged in pairs the members of each pair being provided on their opposing inner sides with ribs 14 which coöperating ribs hold the same in spaced relation while their outer sides 15 are flat or even and engage with the opposing surfaces of the adjacent positive and negative plates.

Each of the negative plates preferably comprises a body or sheet 16 of lead upon opposite sides of which a plurality of parallel ribs 17 are formed by spinning, swaging, rolling or plowing the smooth surface of the body or sheet of lead. The spaces between the several ribs of the negative plate are filled with active material 18 such as spongy lead or peroxid of lead.

When forming the ribs on the body of the negative the outer edges of the ribs are often sharp and irregular in height and these cut or tear the smooth surface of the wood or fibrous separators when assembled with the same in the jar, and thus necessitates unduly frequent renewal of the separators. To present the cutting effect of the negative plate, the outer edges of the same are pressed inwardly so that these several edges are all even and preferably flush with the surface of the active material between the same. During this inward pressure on the negative plate ribs the outer ends of the same are spread or upset more or less, as shown at 19 in Fig. 4, the upset portions of these ribs forming heads or anchors which assist in holding the active material securely in the spaces between the negative plate ribs.

The procedure to attain the above results would be as follows:

The Planté's negatives, whether direct from the manufacturing process formation, or when removed from cells which have already been assembled for service, or in service, are placed between hard blocks of proper thickness and of any suitable material and then pressed between such blocks by hand or machinery until the outer edges of the ribs are upset and form flat surfaces which are smooth enough to prevent the cutting of any flat wood or fibrous separators, which might be placed between the negative and adjacent positive plates.

The negative plates are then placed in suitable tanks when assembled in cells with dummies or positives with the electrolytes and connected to the positive conductor of an electric circuit. The negative plates may be assembled with lead dummies, or old or new positives, as the circumstances may favor. The electrolyte may be of the regular strength, (1,200 specific gravity), or weaker or stronger, as may be convenient. The strength being immaterial so long as it is not unduly below or above the usual strength used in the battery service for which the negatives are intended.

After the negatives have been reversed to a positive condition sufficiently to insure the necessary porosity, the current is reversed until the negative plates are again in the desired condition of porosity and capacity. They are then ready for assembly with their regular positives, if they have not already been reversed from a temporary positive condition to a regular negative condition relative to the regular positives with which they are intended to operate in the service for which they are made.

I claim as my invention:

1. A storage battery plate comprising a body provided with a plurality of ribs the outer edges of which are pressed inwardly so that they are even.

2. A storage battery plate comprising a body provided with a plurality of ribs the outer edges of which are upset so that they are flush and a filling of active material arranged between said ribs.

3. The herein described process of making storage battery plates which comprises forming ribs on a lead body, filling the spaces between said ribs with active material, and pressing the outer edges of said ribs inwardly so that they are even.

4. The herein described process of making storage battery plates which comprises forming ribs on a lead body, filling the spaces between said ribs with active material, pressing the outer edges of said ribs inwardly so that they are even, and then loosening the active material by subjecting the same to a reverse electric current.

5. A storage battery comprising a plurality of alternating negative and positive plates and fibrous separators arranged between the opposing surfaces of adjacent negative and positive plates, each of said negative plates having a ribbed surface which faces the adjacent separator and an active filling between said ribs, and the outer edges of said ribs being pressed inwardly so that they are even.

RUFUS N. CHAMBERLAIN.